United States Patent
Block et al.

(10) Patent No.: US 12,252,235 B2
(45) Date of Patent: Mar. 18, 2025

(54) LINEAR ACTUATOR DRIVEN FLAP MECHANISM

(71) Applicant: The Boeing Company, Arlington, VA (US)

(72) Inventors: Samuel L. Block, Bothell, WA (US); Kevin R. Tsai, Redmond, WA (US)

(73) Assignee: The Boeing Company, Arlington, VA (US)

( * ) Notice: Subject to any disclaimer, the term of this patent is extended or adjusted under 35 U.S.C. 154(b) by 140 days.

(21) Appl. No.: 18/172,569

(22) Filed: Feb. 22, 2023

(65) Prior Publication Data

US 2024/0278905 A1    Aug. 22, 2024

(51) Int. Cl.
*B64C 13/38*    (2006.01)
*B64C 3/18*    (2006.01)

(52) U.S. Cl.
CPC ........... *B64C 13/38* (2013.01); *B64C 3/18* (2013.01)

(58) Field of Classification Search
CPC .. B64C 13/38; B64C 3/18; B64C 9/04; B64C 13/24; B64C 9/16
See application file for complete search history.

(56) References Cited

U.S. PATENT DOCUMENTS

| | | | | |
|---|---|---|---|---|
| 4,283,029 A * | 8/1981 | Rudolph | ........... | B64C 9/18 244/215 |
| 8,104,721 B2 * | 1/2012 | Pohl | ........... | B64C 9/16 244/215 |
| 8,757,544 B2 * | 6/2014 | Ito | ........... | B64C 13/36 244/99.3 |
| 9,540,095 B2 * | 1/2017 | Ferreira | ........... | B64C 13/30 |
| 11,142,301 B2 * | 10/2021 | Good | ........... | B64C 13/44 |
| 11,161,594 B2 | 11/2021 | Tsai et al. | | |
| 2021/0061442 A1 | 3/2021 | Tsai et al. | | |
| 2021/0179257 A1 * | 6/2021 | Tsai | ........... | B64C 3/50 |

* cited by examiner

*Primary Examiner* — Medhat Badawi
*Assistant Examiner* — Vicente Rodriguez
(74) *Attorney, Agent, or Firm* — Yee & Associates, P.C.

(57) ABSTRACT

A linear actuator driven flap mechanism for an aircraft wing is contained within a wing support and fairing of the aircraft wing. The rib frame of the flap mechanism is attached to the wingbox structure of the aircraft wing at a first and second point. The rib frame of the flap mechanism defines a width with a first and second web. A linear actuator and a motion linkage are positioned with the width between the first and second webs of the rib frame. The linear actuator is not mechanically driven rotary actuation or mechanically driven linear actuation. As a result of the compact construction, the flap mechanism can be employed in thinner, smaller aircraft wings being designed today.

20 Claims, 16 Drawing Sheets

LINEAR ACTUATOR DRIVEN FLAP MECHANISM

BACKGROUND INFORMATION

1. Field

The present disclosure relates generally to aircraft wing mechanisms. More specifically, the present disclosure relates to a drooped spoiler dropped hinge underwing or trailing cove mounted flap mechanism for deploying flaps of aircraft.

2. Background

On rear spar mounted drooping spoiler configurations commonly employed in the large commercial aircraft that have been in service for the past few decades, the spoiler droop forces flap supports lower in the wing loft resulting in deeper fairings. The deeper, larger, and particularly wider fairings increase high speed drag. The rear spar attachment is short coupled and limited by wing thickness. The drive linkage for deploying the flaps is complex with custom hardware. The drive linkage requires a difficult assembly, installation, and maintenance. Further, large cutouts in wing ribs are required for attachment purposes. The actuator interface with the drive linkage is complex and heavy and is poorly integrated with the spoiler inner mold line. This is particularly relevant when the spoiler droops, as the actuator needs to be low enough to clear the spoiler inner mold line. As wings get thinner, this architecture doesn't scale well since the fairings get disproportionately deeper as a result.

For the smaller, thinner, lighter aircraft wings being designed today, space within the wingbox (ribs, spars, skin) and in the trailing edge cove aft of the spar for placement of various system components is at a premium. There is limited space available for the complex spoiler configurations and flap mechanisms employed in previous aircraft. In previous aircraft, the design of the trailing edge cove is such that it has exactly the bare minimum space needed in order to fit these components, however aircraft performance will directly suffer as the large actuators will drive the wing planform and loft to be suboptimal.

Therefore, it would be desirable to have a method and apparatus that takes into account at least some of the issues discussed above, as well as other possible issues.

SUMMARY

An illustrative embodiment of the present disclosure provides a flap mechanism for an aircraft comprising a frame rib, a motion linkage, and a linear actuator. The frame is connected to a first point and a second point on an aircraft wing. The frame rib comprises a first web spaced from a second web which defines a volume having a width. The motion linkage is connected to an aft end of the frame rib and to a flap of the aircraft. The linear actuator is connected to the frame rib and connected to the motion linkage. The motion linkage and the linear actuator are positioned between the first web and the second web of the frame rib.

Another illustrative embodiment of the present disclosure provides a flap deployment system for an aircraft wing comprising a rear spar, a frame rib, a flap, and a linear actuator. The frame rib comprises a first web and a second web where the first web is spaced from the second web by a width. The frame rib further comprises a forward end connected to a first point on the aircraft wing and an aft end connected to a motion linkage. The flap is connected to the motion linkage. The linear actuator is connected to the frame rib and the motion linkage. The motion linkage and the linear actuator are positioned between the first web and the second web.

A further illustrative embodiment of the present disclosure provides a method for deploying a flap of an aircraft wing. The method includes a step of connecting a frame rib to a first point on an aircraft wing and connecting the frame rib to a second point on the aircraft wing. The frame rib comprises a first web spaced from a second web defining a volume having a width. The method includes a step of connecting a linear actuator to the frame rib and connecting the linear actuator to a flap of the aircraft wing. The linear actuator is a non-mechanical linear actuator and is positioned between the first web and the second web. The method includes a step of operating the linear actuator.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that a typical rear spar mounted drooping spoiler flap deploying mechanism designed for commercial aircraft of the past is oversized and overcomplicated for use in today's smaller, thinner aircraft wings.

The illustrative embodiments recognize and take into account that flap deploying mechanisms designed for commercial aircraft of the past include deeper, larger, and particularly wider fairings that increase high speed drag.

The illustrative embodiments also recognize and take into account that previous flap deploying mechanisms are complex and include custom hardware and that the drive linkage requires a difficult assembly, installation, and maintenance.

The illustrative embodiments also recognize and take into account that previous flap deploying mechanisms typically employ mechanical actuators that are oversized and infringe on wingbox design and shape. Theses mechanical actuators, for example, include mechanically driven, geared rotary actuation or ball screw linear actuation incorporating a torque tube.

In other words, the mechanical actuators include a gearbox for converting high RPM low torque from a torque tube into low RPM high torque in order to deploy the flaps.

Thus, the illustrative embodiments provide a less complex, non-mechanical linear actuator contained within the confines of a frame rib. The illustrative embodiments provide a frame rib that is connected to an aircraft wing in two locations that frees up the space in the trailing cove behind the rear spar. Thus, the illustrative embodiments provide a less complicated, lower weight, space saving flap deployment mechanism allowing for a thinner, lighter aircraft wing.

Figure 1:
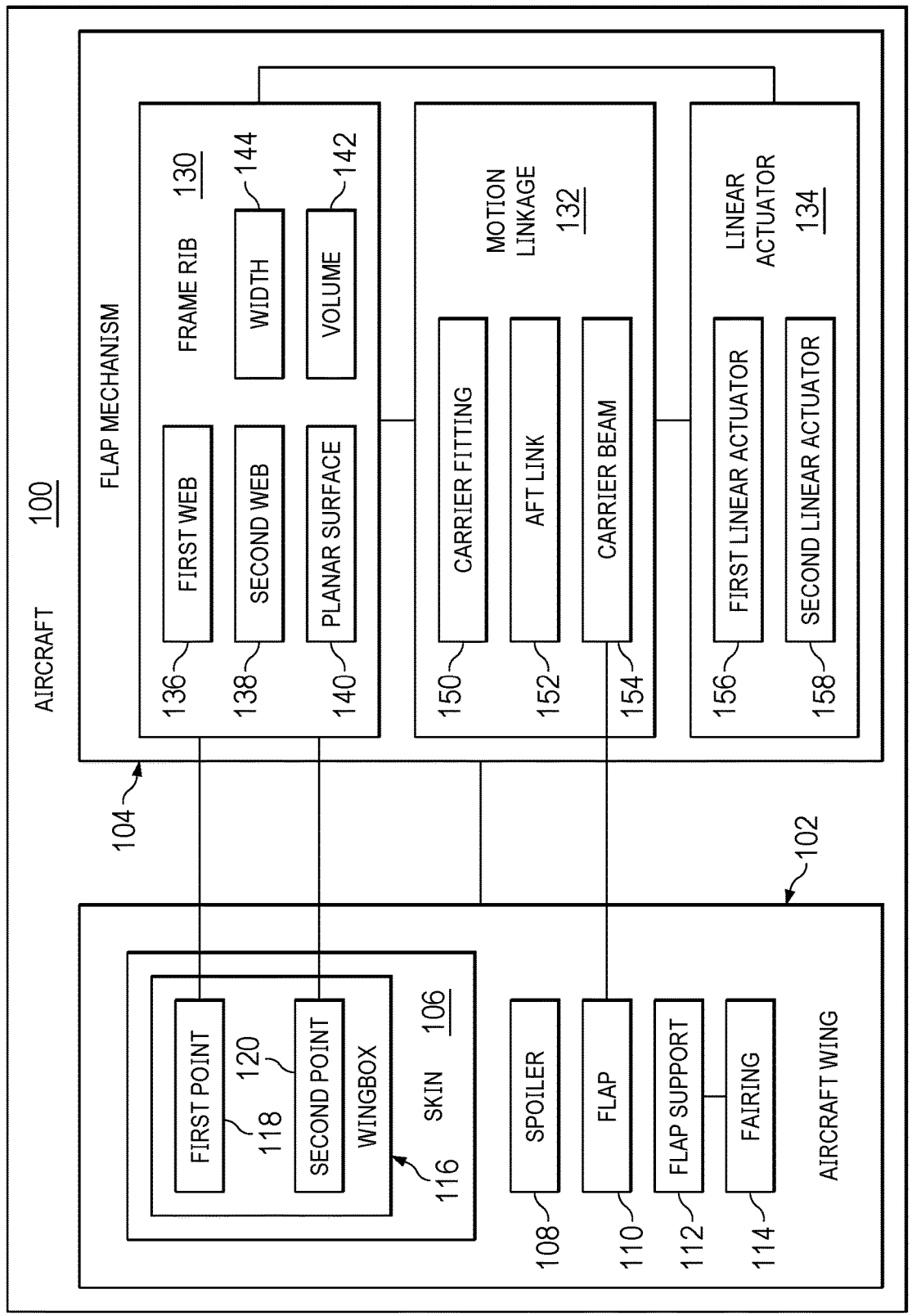
FIG. 1 is an illustration of a block diagram of a platform in accordance with an illustrative embodiment.

With reference now to the figures and, in particular, with reference to FIG. 1, an illustration of a block diagram of aircraft 100 is depicted in accordance with an illustrative embodiment. Aircraft 100 has aircraft wing 102 and flap mechanism 104 in this illustrative example.

In this illustrative example, aircraft wing 102 having flap mechanism 104 can be installed in aircraft 100.

In this illustrative example, aircraft wing 102 includes skin 106, spoiler 108, flap 110, flap support 112, fairing 114, and wingbox 116.

Wingbox 116 is the internal structure of aircraft wing 102 and typically includes ribs and spars (not shown). Wingbox 116 is surrounded by skin 106. Wingbox 116 includes first point 118 and second point 120. First point 118 and second point 120 are the locations where aircraft wing 102 is connected to flap mechanism 104.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

In this illustrative example, spoiler 108 is considered a drooped spoiler. As flap 110 deploys via operation of flap mechanism 104, spoiler 108 pivots with respect to wingbox 116 to cover any gaps created between wingbox 116 and flap 110 in order to maintain an aerodynamic shape.

Flap support 112 is connected to fairing 114. Preferably, flap mechanism 104 is contained within fairing 114. However, in certain circumstances, a linear actuator of flap mechanism 104 may be positioned outside of fairing 114.

In this illustrative example, flap mechanism 104 includes frame rib 130, motion linkage 132, and linear actuator 134.

In this illustrative example, frame rib 130 has first web 136 spaced from second web 138. First web 136 and second web 138 are generally parallel and are connected to and supported by planar surface 140. First web 136, second web 138, and planar surface 140 define volume 142. First web 136 is spaced from second web 138 a distance defined as width 144. Motion linkage 132 and linear actuator 134 are positioned within width 144 between first web 136 and second web 138.

Frame rib 130 is connected to aircraft wing 102 at first point 118 of wingbox 116 and second point 120 of wingbox 116. For example, first point 118 may be an underwing fitting of aircraft wing 102 or under a rear spar of aircraft wing 102. For example, second point 120 may be under the rear spar of aircraft wing 102 or aft of the rear spar of aircraft wing 102.

In this illustrative example, motion linkage 132 includes carrier fitting 150, aft link 152, and carrier beam 154. Carrier fitting 150 is pivotally connected to frame rib 130. Carrier fitting 150 is pivotally connected to linear actuator 134. Carrier fitting 150 is pivotally connected to carrier beam 154. Aft link 152 is pivotally connected to carrier fitting 150 and carrier beam 154. Carrier beam 154 is pivotally connected to aft link 152 and carrier fitting 150.

Frame rib 130 is fixed relative to wingbox 116. Flap 110 is connected and fixed relative to carrier beam 154. Carrier fitting 150 pivots when acted on by linear actuator 134. As carrier fitting 150 pivots, both aft link 152 and carrier beam 154, to which flap 110 is attached, move with respect to carrier fitting 150 in order to move flap 110 between a flap up position and a flap down position.

In this illustrative example, linear actuator 134 is pivotally connected to frame rib 130 and aft link 152 of motion linkage 132. In this illustrative example, linear actuator 134 may be first linear actuator 156. However, linear actuator 134 may comprise first linear actuator 156 and second linear actuator 158 simultaneously. First linear actuator 156 may work simultaneously with second linear actuator 158 or second linear actuator 158 may be present as a failsafe or backup in case of failure of first linear actuator 156.

In this illustrative example, it is important to note that linear actuator 134 is not a mechanically driven actuator. Linear actuator 134 is not a mechanically driven rotary actuator. Linear actuator 134 is not a mechanically driven linear actuator such as a geared rotary actuator or a ball screw. For example, linear actuator 134 can be a hydraulic linear actuator or an electric linear actuator. Linear actuator 134 has an extended position and a retracted position. When in the retracted position, linear actuator 134 occupies less space that when in the extended position.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
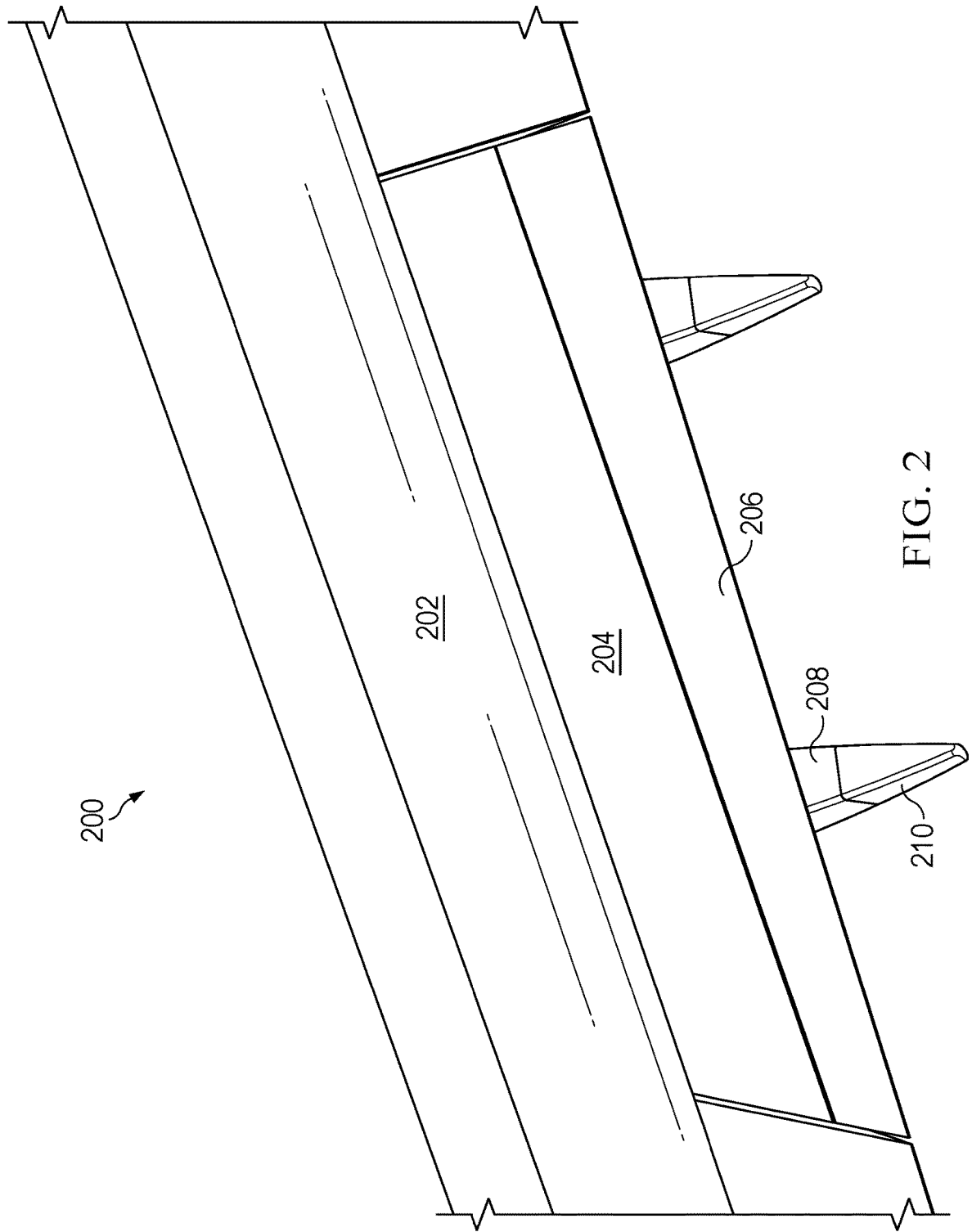
FIG. 2 is an illustration of an aircraft wing in accordance with an illustrative embodiment.

With reference next to FIG. 2, an illustration of an aircraft wing for use with a linear actuator driven flap mechanism is depicted in accordance with an illustrative example. In this illustrative example, aircraft wing 200 is an example of one implementation for aircraft wing 102 shown in block form in FIG. 1.

As depicted, aircraft wing 200 includes skin 202 surrounding wingbox structure (not shown) to form an aerodynamic wing profile. Spoiler 204 is connected to the wingbox structure. Flap 206 is connected to a flap mechanism (not shown). The flap mechanism is an example of one implementation for flap mechanism 104 in FIG. 1. The flap mechanism is contained within wing support 208 and fairing 210.

With reference next to FIGS. 3-7, illustrations of a flap mechanism for an aircraft wing are depicted in accordance with an illustrated example. In this illustrative example, aircraft wing 300 and flap mechanism 301 are examples of one implementation for aircraft wing 102 and flap mechanism 104 shown in block form in FIG. 1.

In this illustrative example, upper skin panel 302 and lower skin panel 304 are attached to rear spar fittings 306 to form aerodynamic shape of aircraft wing 300. Underwing fittings 308 are connected to other internal structure of aircraft wing 300.

Frame rib 310 is connected to underwing fittings 308 at connection point 312. Frame rib 310 is connected to rear spar fittings 306 at connection point 314. In this illustrative example, connection point 312 is an example of one implementation for first point 118 and connection point 314 is an example of one implementation for second point 120 shown in block form in FIG. 1. In this illustrative example, connection point 312 is an example of an underwing fitting and connection point 314 is an example of an under rear spar fitting.

Spoiler 320 is pivotally connected to internal structure of aircraft wing 300. Linear actuator 322 is pivotally connected to frame rib 310. Linear actuator 322 is pivotally connected carrier fitting 332 of motion linkage 324. Carrier fitting 332 is pivotally connected to aft link 330 of motion linkage 324. Carrier beam 334 of motion linkage 324 is pivotally connected to aft link 330. Flap 340 is connected to carrier beam 334.

Frame rib 310 includes first web 502 spaced from second web 504. First web 502 and second web 504 are generally parallel and are connected to and supported by planar surface 602. First web 502, second web 504, and planar surface 602 define volume 604. First web 502 is spaced from second web 504 a distance defined as width 606. All components of motion linkage 324 and linear actuator 322 are positioned within width 606 between first web 502 and second web 504.

Figure 3:
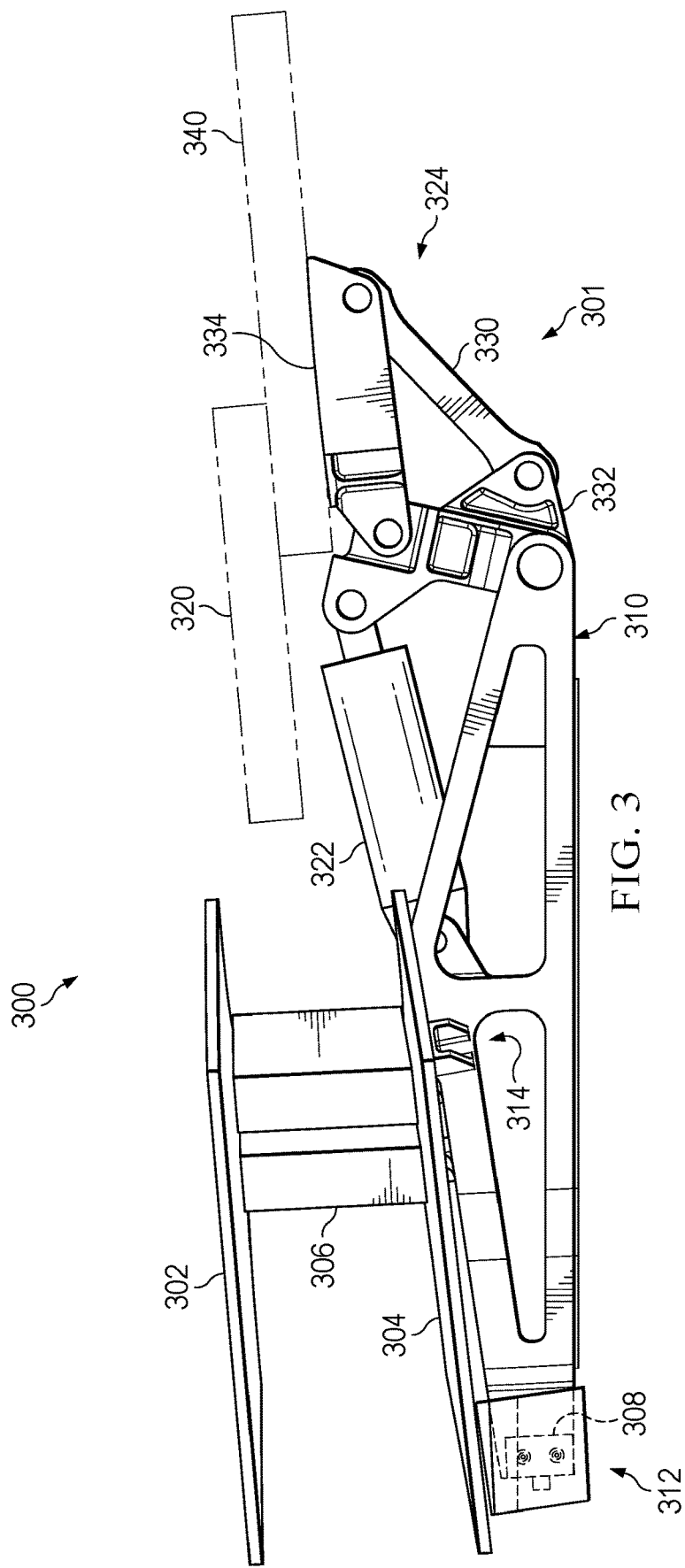
FIGS. 3-7 are illustrations of a flap mechanism for an aircraft in accordance with an illustrative example.
Figure 4:
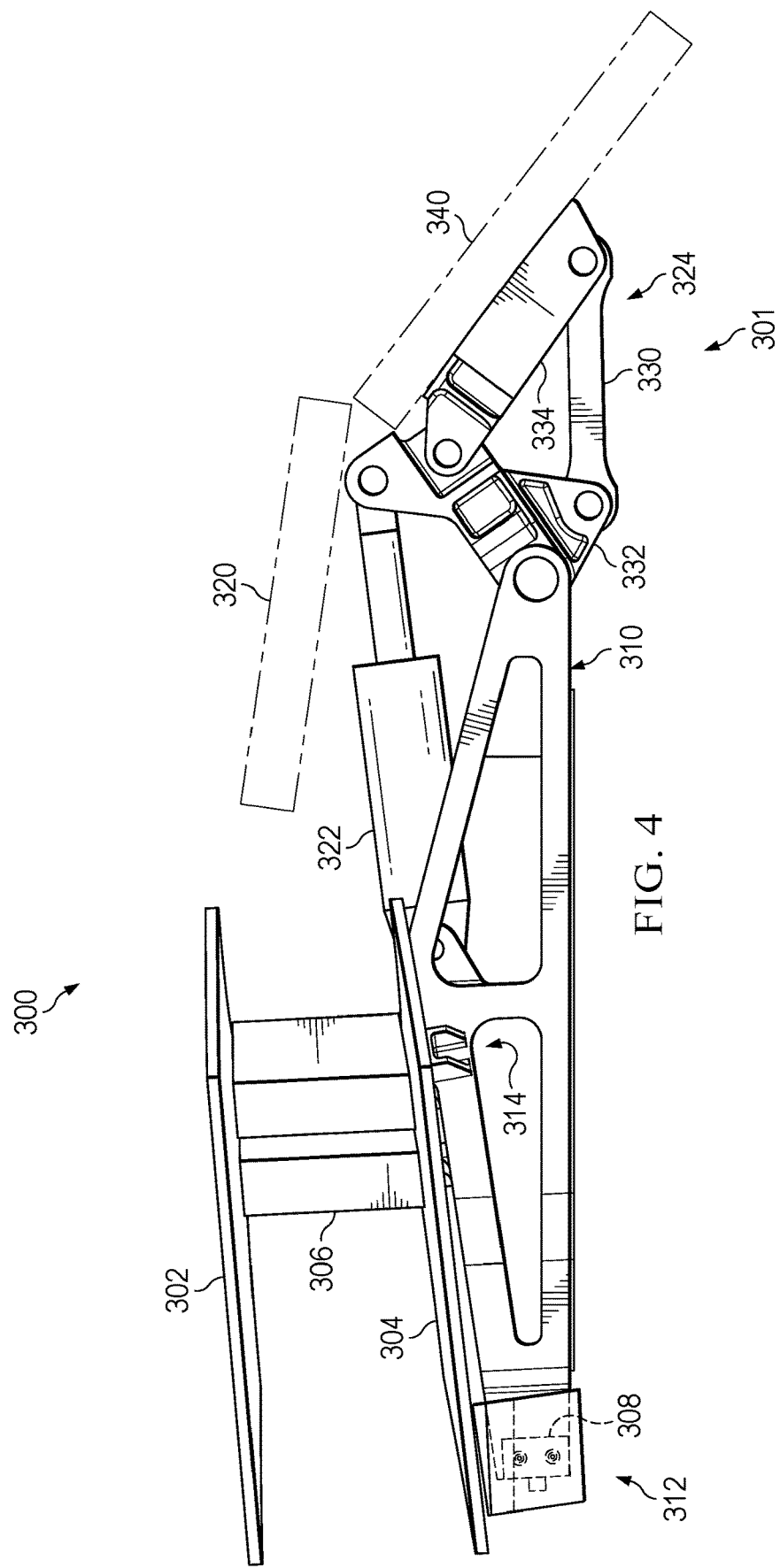
Figure 5:
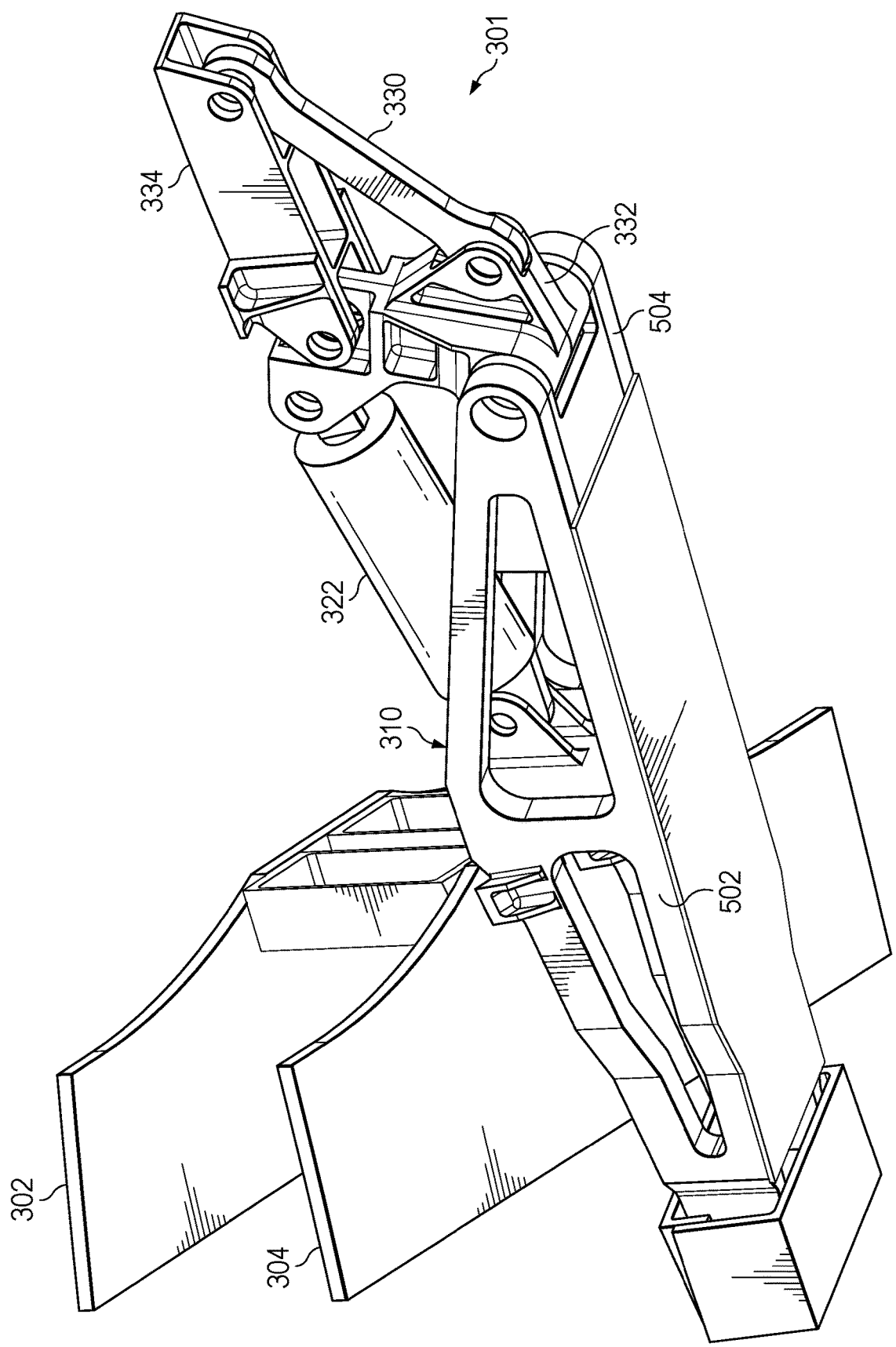
Figure 6:
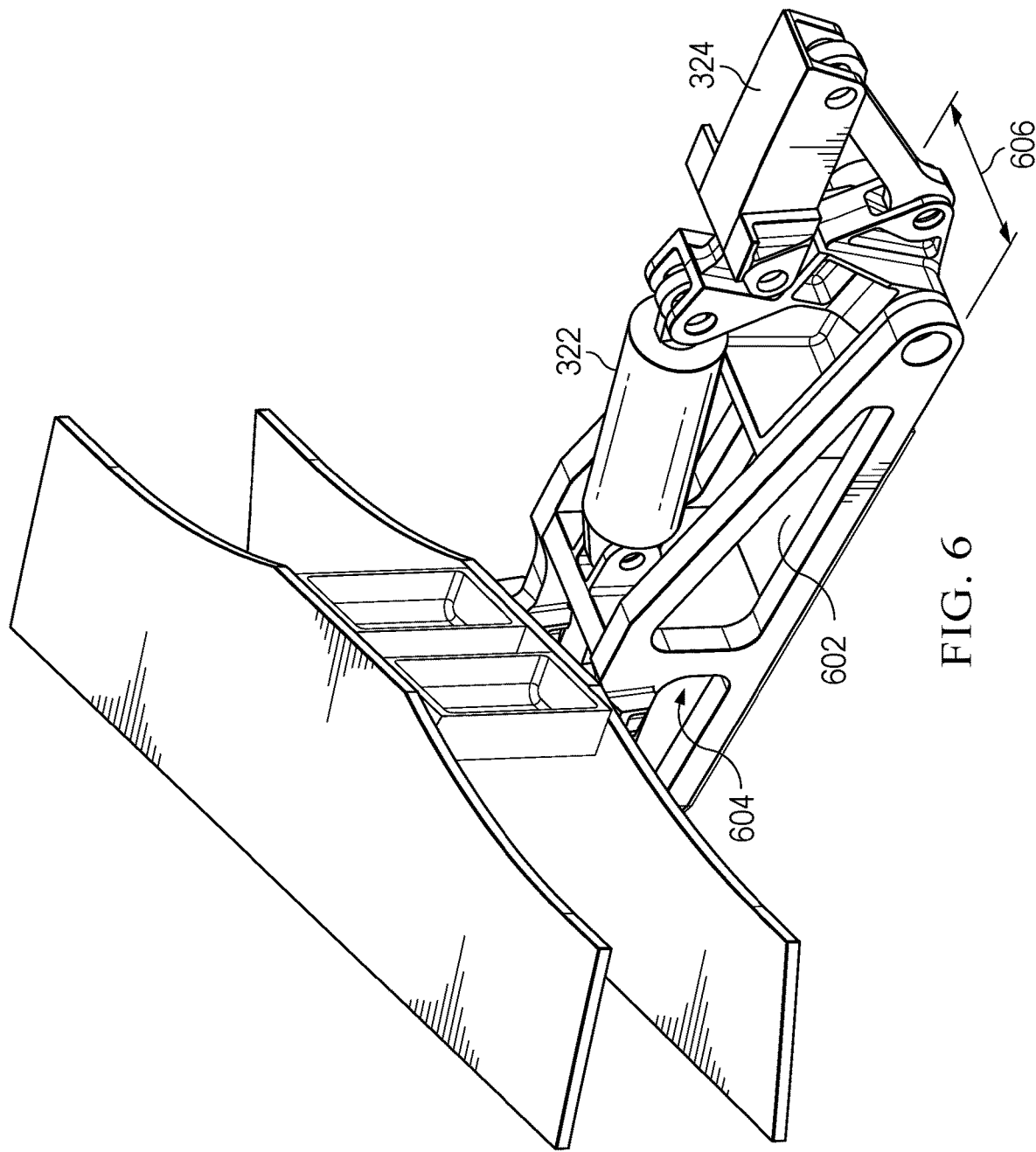
Figure 7:
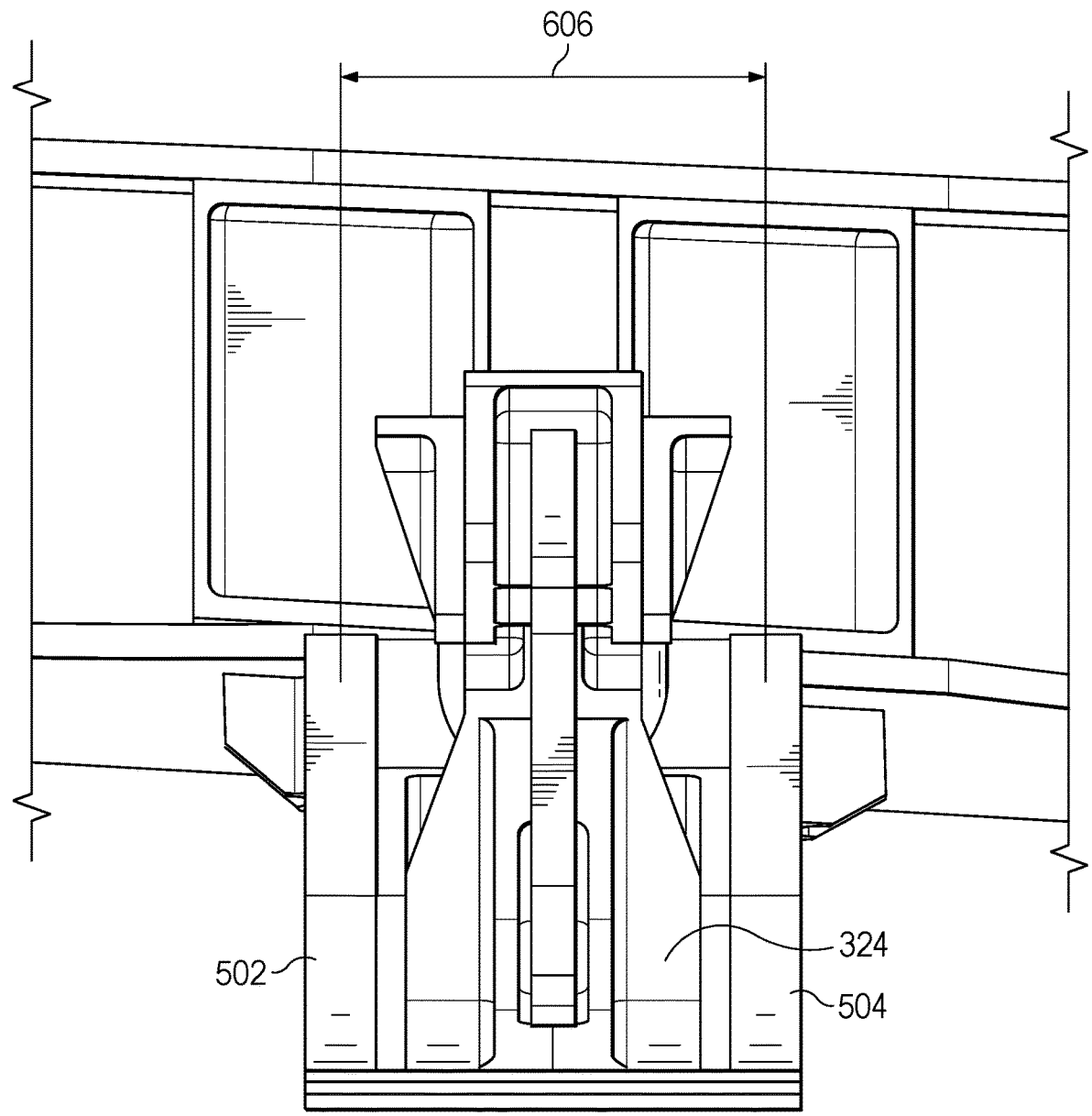

In use, upon activation of linear actuator 322, carrier fitting 332 pivots. As carrier fitting 332 pivots, both aft link 330 and carrier beam 334 move with respect to carrier fitting 332. As flap 340 is attached to carrier beam 334, activation of linear actuator 322 results in the movement of flap 340 between a flap up position and a flap down position. FIG. 3 depicts a flap up position. FIG. 4 depicts a flap down position.

Figure 8:
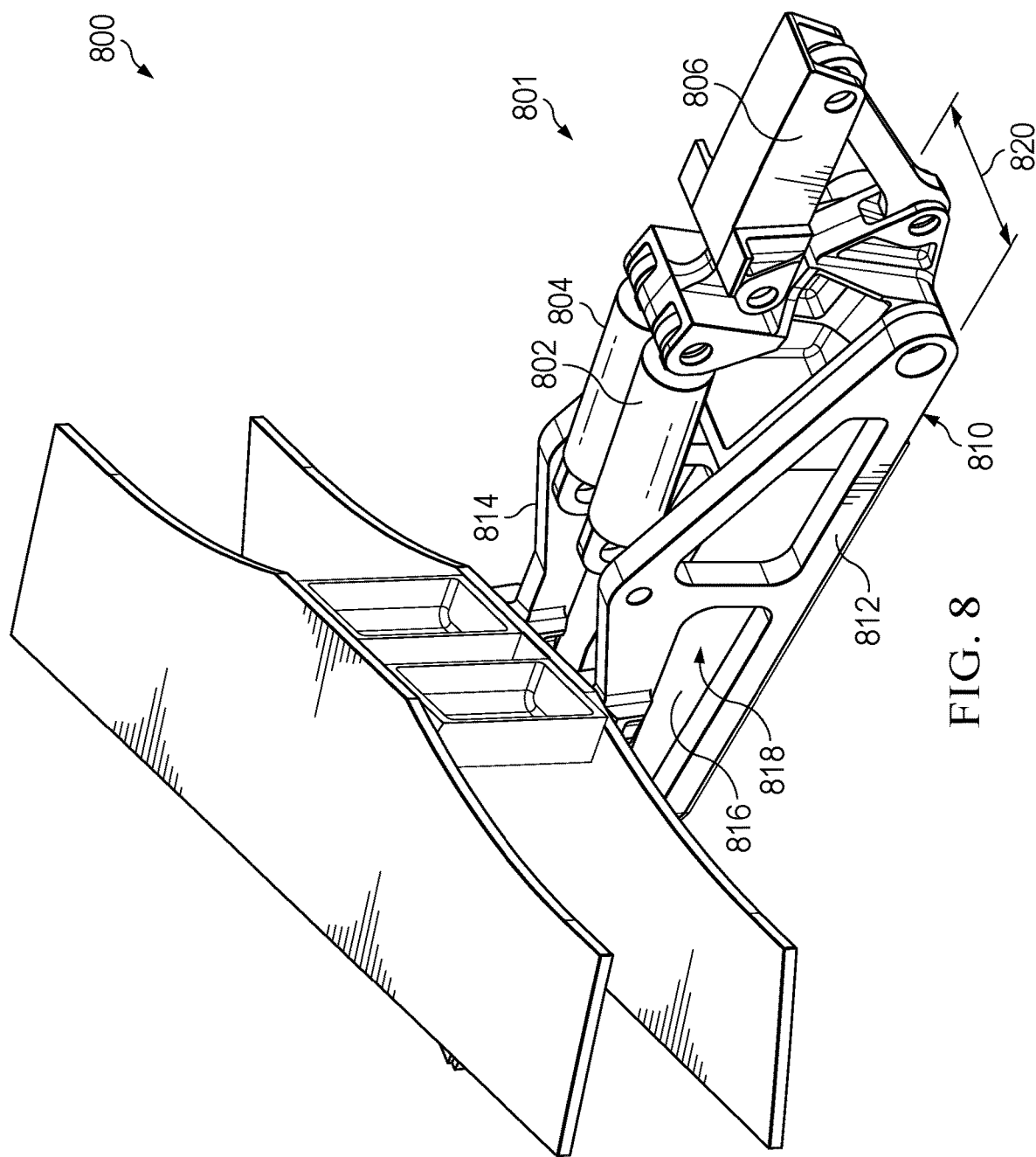
FIG. 8 is an illustration of a flap mechanism for an aircraft in accordance with an illustrative example.
Figure 9:
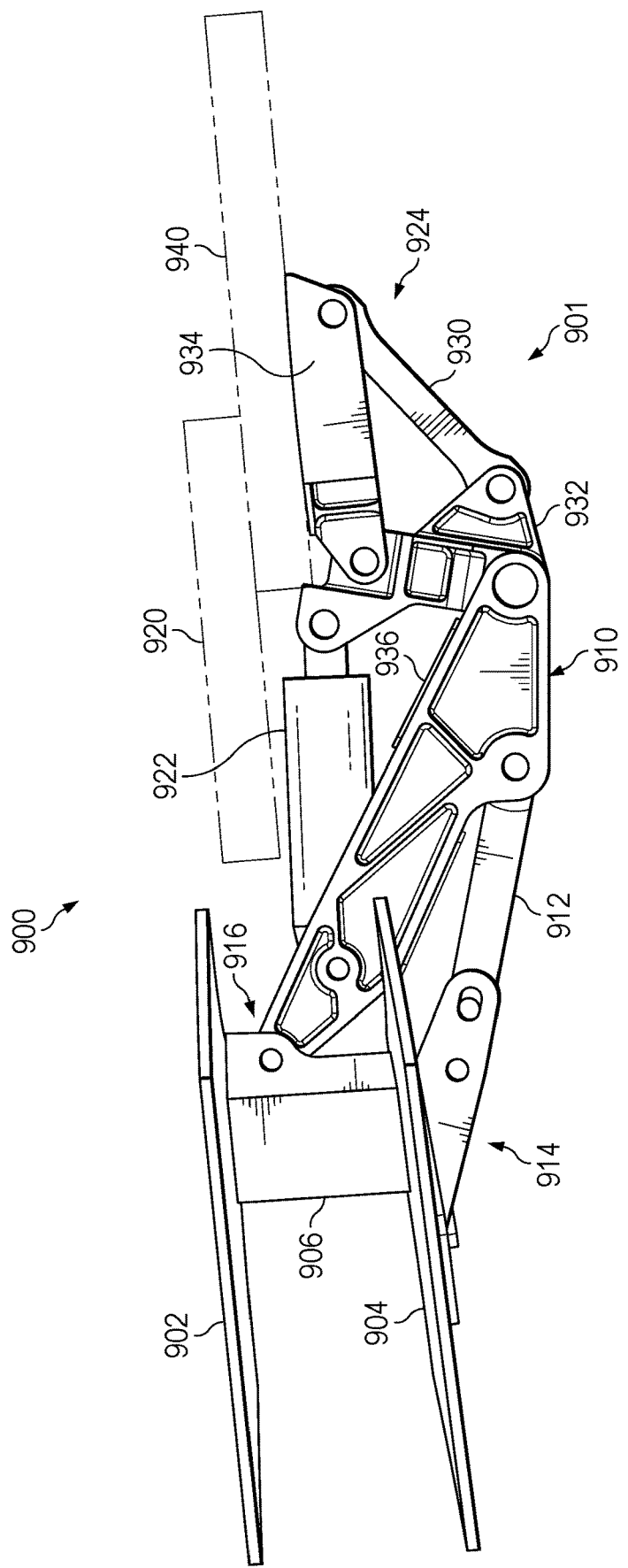
FIGS. 9-12 are illustrations of a flap mechanism for an aircraft in accordance with an illustrative example.
Figure 10:
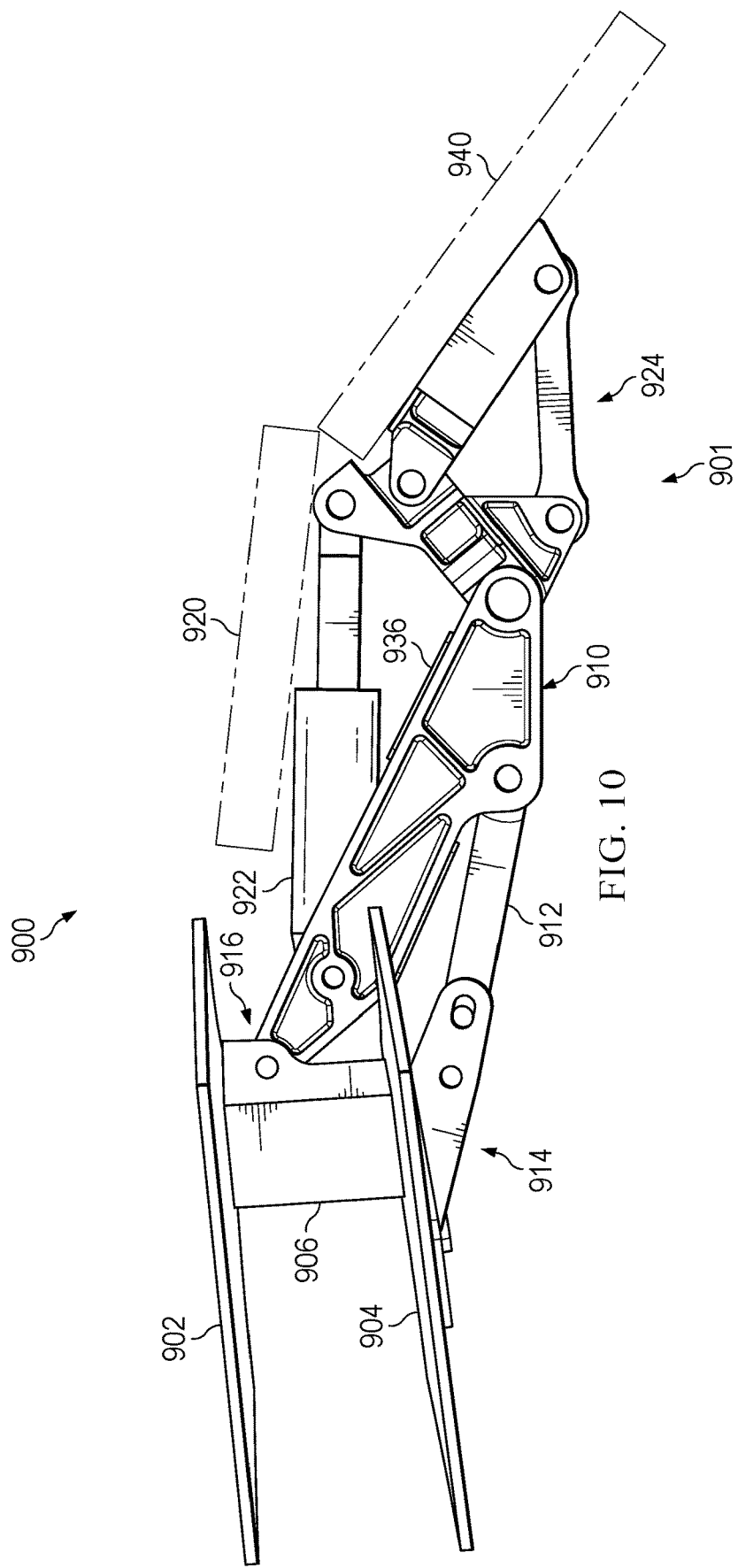
Figure 11:
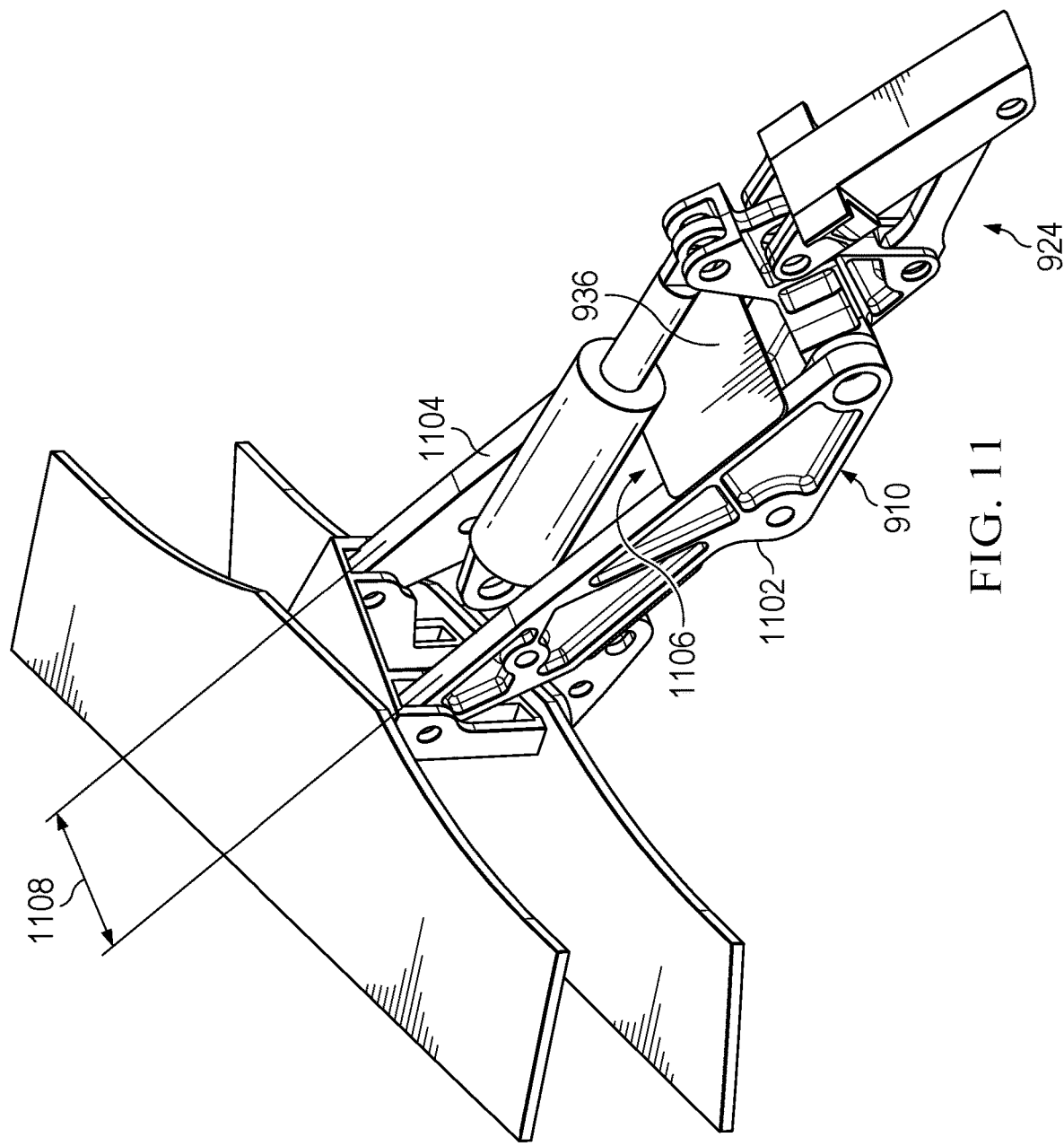
Figure 12:
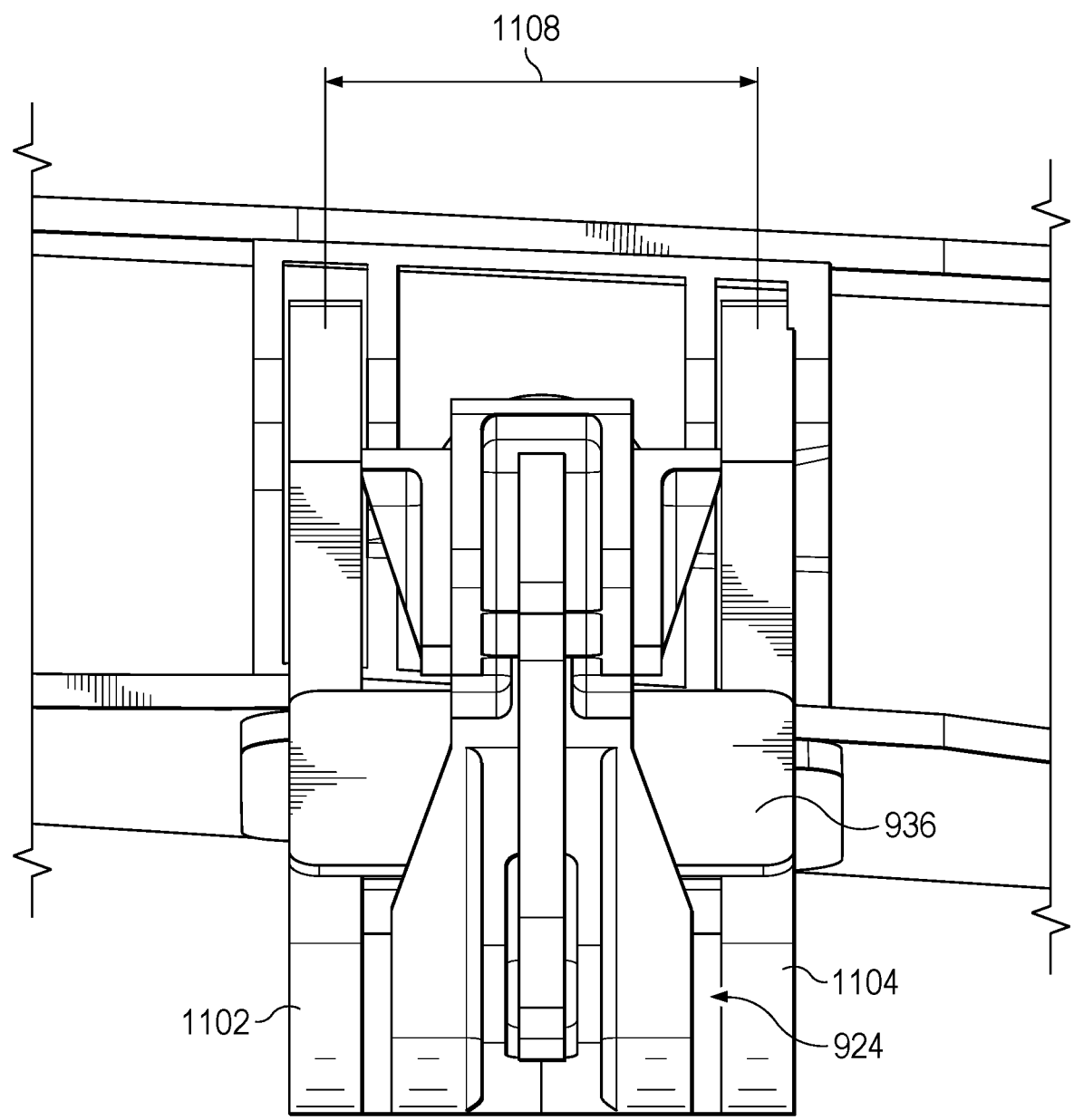

With reference next to FIG. 8, illustration of a flap mechanism for an aircraft wing is depicted in accordance with an illustrated example. In this illustrative example, aircraft wing 800 and flap mechanism 801 are examples of one implementation for aircraft wing 102 and flap mechanism 104 shown in block form in FIG. 1.

Flap mechanism 801 includes first linear actuator 802 and second linear actuator 804. First linear actuator 802 is pivotally connected to frame rib 810. Second linear actuator 804 is pivotally connected to frame rib 810. Both first linear actuator 802 and second linear actuator 804 are pivotally connected motion linkage 806.

Frame rib 810 includes first web 812 spaced from second web 814. First web 812 and second web 814 are generally parallel and are connected to and supported by planar surface 816. First web 812, second web 814, and planar surface 816 define volume 818. First web 812 is spaced from second web 814 a distance defined as width 820. All components of motion linkage 806 and first linear actuator 802 and second linear actuator 804 are positioned within width 820 between first web 812 and second web 814.

In use, first linear actuator 802 may work in conjunction with second linear actuator 804 or second linear actuator 804 may be present as backup in case of failure of first linear actuator 802.

With reference next to FIGS. 9-12, illustrations of a flap mechanism for an aircraft wing are depicted in accordance with an illustrated example. In this illustrative example, aircraft wing 900 and flap mechanism 901 are examples of one implementation for aircraft wing 102 and flap mechanism 104 shown in block form in FIG. 1.

In this illustrative example, upper skin panel 902 and lower skin panel 904 are attached to rear spar fittings 906 to form the shape of aircraft wing 900.

Frame rib 910, via tension link 912, is connected to rear spar fittings 906 at connection point 914. Tension link 912 is pivotally connected to frame rib 910. Frame rib 910 is also connected to rear spar fittings 906 at connection point 916. In this illustrative example, connection point 914 is an example of one implementation for first point 118 and connection point 916 is an example of one implementation for second point 120 shown in block form in FIG. 1. In this illustrative example, connection point 914 is an example of an under rear spar fitting and connection point 916 is an example of an aft of the rear spar fitting.

Spoiler 920 is pivotally connected to internal structure of aircraft wing 900. Linear actuator 922 is pivotally connected to frame rib 910. Linear actuator 922 is pivotally connected carrier fitting 932 of motion linkage 924. Carrier fitting 932 is pivotally connected to aft link 930 of motion linkage 924. Carrier beam 934 of motion linkage 924 is pivotally connected to aft link 930. Flap 940 is connected to carrier beam 934.

Frame rib 910 includes first web 1102 spaced from second web 1104. First web 1102 and second web 1104 are generally parallel and are connected by planar surface 936. First web 1102, second web 1104, and planar surface 936 define volume 1106. First web 1102 is spaced from second web 1104 a distance defined as width 1108. All components of motion linkage 924 and linear actuator 922 are positioned within width 1108 between first web 1102 and second web 1104.

Figure 13:
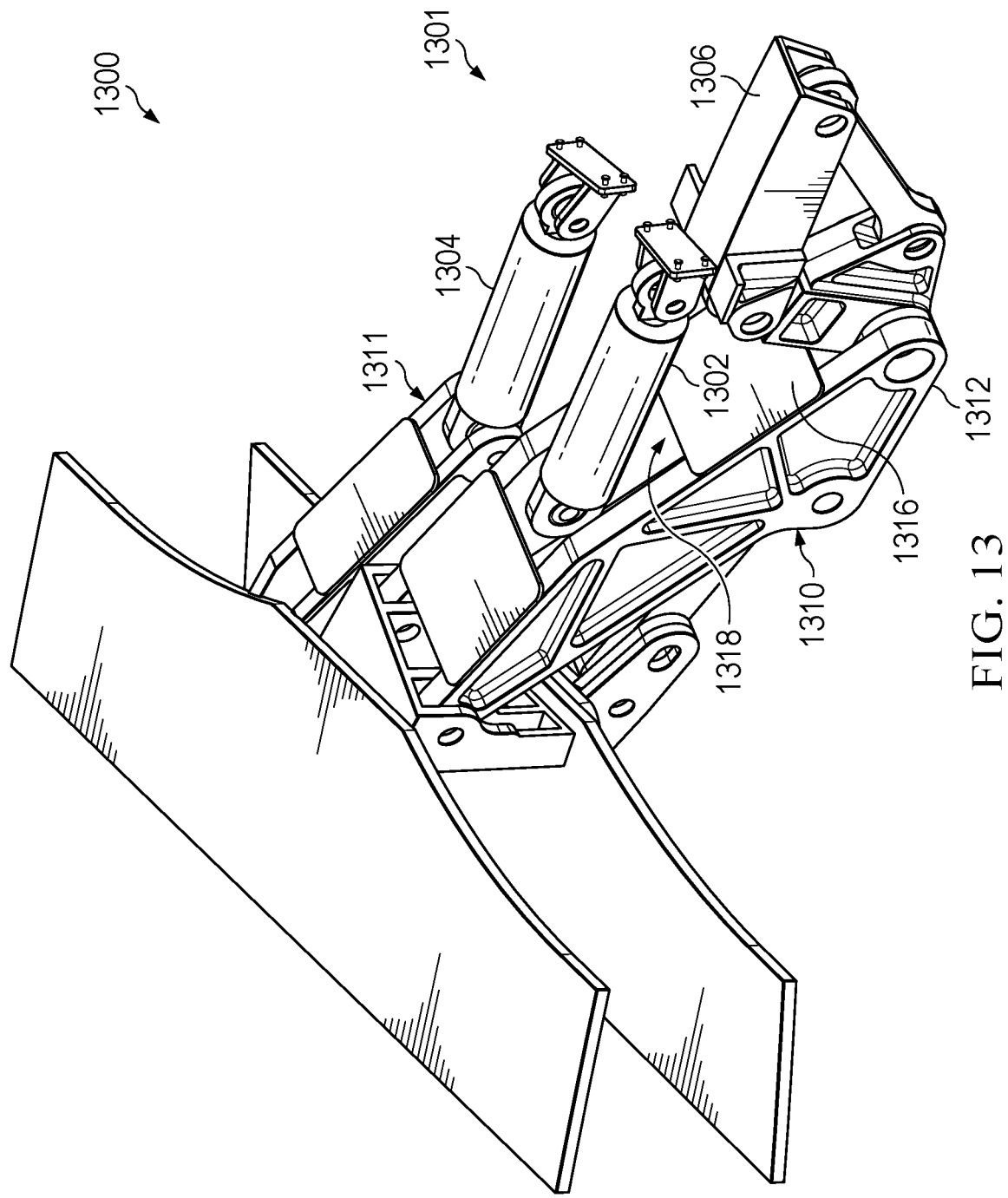
FIGS. 13-14 are illustrations of a flap mechanism for an aircraft in accordance with an illustrative example.
Figure 14:
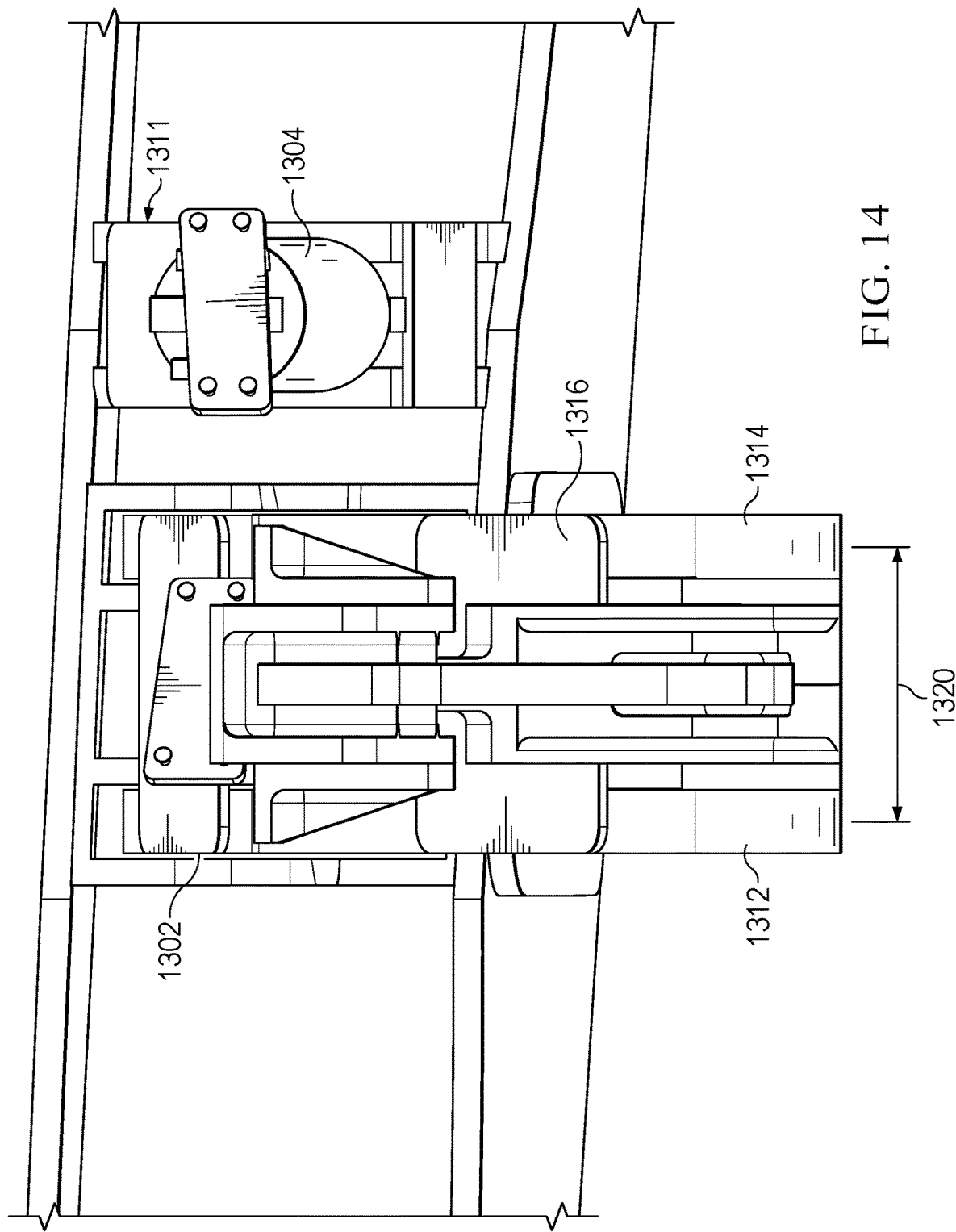

With reference next to FIGS. 13-14, illustrations of a flap mechanism for an aircraft wing are depicted in accordance with an illustrated example. In this illustrative example, aircraft wing 1300 and flap mechanism 1301 are examples of one implementation for aircraft wing 102 and flap mechanism 104 shown in block form in FIG. 1.

Flap mechanism 1301 includes first linear actuator 1302 and second linear actuator 1304. First linear actuator 1302 is connected to frame rib 1310. Second linear actuator 1304 is connected to frame rib 1311. First linear actuator 1302 is pivotally connected to frame rib 1310 and second linear actuator 1304 is pivotally connected to frame rib 1311.

Frame rib 1310 includes first web 1312 spaced from second web 1314. First web 1312 and second web 1314 are generally parallel and are connected by planar surface 1316. First web 1312, second web 1314, and planar surface 1316 define volume 1318. First web 1312 is spaced from second web 1314 a distance defined as width 1320. All components of motion linkage 1306 and first linear actuator 1302 are positioned within width 1320 between first web 1312 and second web 1314. Second linear actuator 1304 is positioned outside of volume 1318.

In use, first linear actuator 1302 may work in conjunction with second linear actuator 1304 or second linear actuator 1304 may be present as backup in case of failure of first linear actuator 1302.

Figure 15:
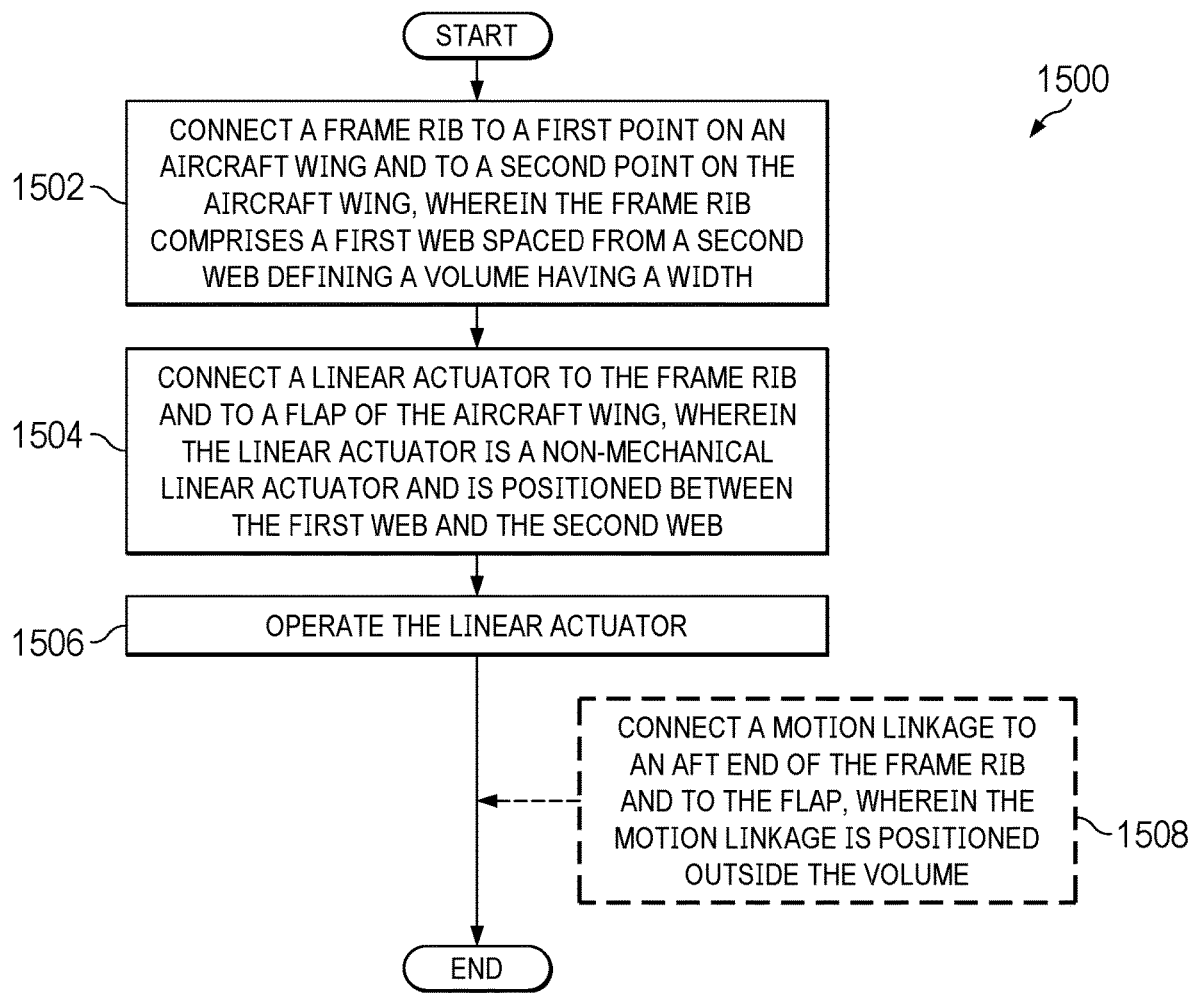
FIG. 15 is an illustration of a flowchart of a process for deploying a flap of an aircraft wing in accordance with an illustrative embodiment.

With reference next to FIG. 15, an illustration of a flowchart of a process 1500 for deploying a flap of an aircraft wing. The method depicted in FIG. 15 may be used in conjunction with flap mechanism depicted in FIGS. 1-14.

The process begins by connecting A-frame rib to a first point on an aircraft wing and to a second point on the aircraft wing (operation 1502). The frame rib includes a first web spaced from a second web that defines a volume having a width. The process connects a linear actuator to the frame rib into a flap of the aircraft wing (operation 1504). The linear actuator is a non mechanical linear actuator and is positioned within the width between the first web and the second web. The process then operates the linear actuator (operation 1506).

The process may include the process may include connecting a motion linkage two and aft end of the frame rib and to the flap (operation 1508). The motion linkage is positioned outside of the volume. operating the linear actuator may comprise extending a piston connected to the motion linkage in order to deploy the flap.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
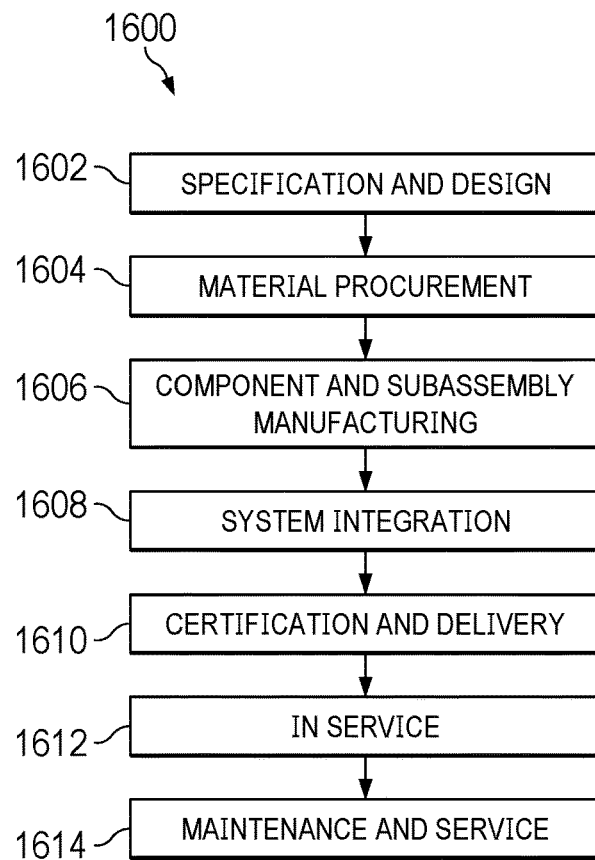
FIG. 16 is an illustration of a block diagram of an aircraft manufacturing and service method in accordance with an illustrative embodiment.
Figure 17:
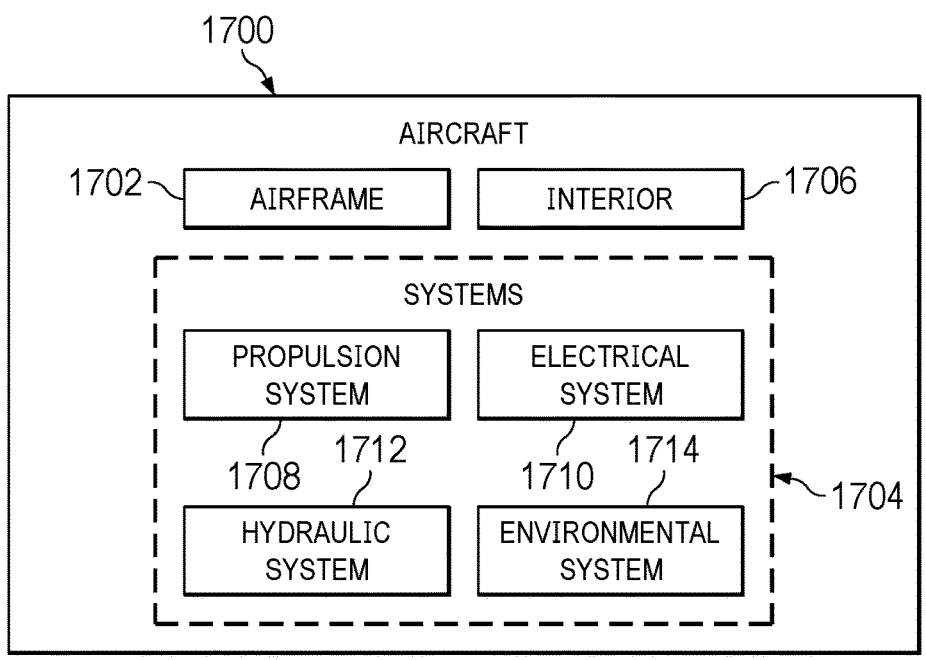
FIG. 17 is an illustration of a block diagram of an aircraft in which an illustrative embodiment may be implemented.

The illustrative embodiments of the disclosure may be further described in the context of aircraft manufacturing and service method 1600 as shown in FIG. 16 and aircraft 1700 as shown in FIG. 17. Turning first to FIG. 16, an illustration of a block diagram of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance, service, or inspection.

Flap mechanism 104 may be installed on an aircraft during component and subassembly manufacturing 1606. In addition, flap mechanism 104 may be retrofitted onto aircraft 1700 in FIG. 17 during routine maintenance and service 1614 as part of a modification, reconfiguration, or refurbishment of aircraft 1700 in FIG. 17.

Each of the processes of aircraft manufacturing and service method 1600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 17, an illustration of a block diagram of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612, during maintenance and service 1614, inclusive of inspection, in FIG. 16, or both. The use of a number of the different illustrative embodiments may substantially expedite the assembly of aircraft 1700, reduce the cost of aircraft 1700, or both expedite the assembly of aircraft 1700 and reduce the cost of aircraft 1700.

The proposed invention is best used on low fowler, simple dropped hinge drooping spoiler flap mechanisms on small, thin wings. One benefit is simple, cost-effective underwing beam supports are a well-known structural commodity, however in combination with the non-mechanically driven linear actuator, they achieve superior systems integration. Other types of mechanical actuation would cause the underwing beam fairing to grow, however the linear actuator is both small and crucially, doesn't take up as much space when the flap is stowed (unlike a ball screw). This opens up a huge volume in the trailing edge cove to place and route various systems through the area, with no constraints avoiding actuators or structure. Typically routing systems through the flap supports is one of the most constrained areas on the trailing edge, even on large wing applications. Another benefit is that fairing size is greatly reduced compared to traditional mechanical systems-both depth and width. Another benefit is that integration with drooped spoilers does not constrain the flap mechanism at all, since the primary flap support structure is below the wing and out of the path of spoiler droop.

This invention enables cheaper manufacturing, easier installation, and reduced fairing size on trailing edge drooping spoiler flap supports. The disclosed examples enable superior systems integration on small, thin wings, which results in tighter packaging and more optimized wing planform. Additionally, this invention decouples wingbox design constraints (ribs, stringers, and access hole considerations) from flap support design constraints, allowing both to optimize independently for weight, cost, and drag.

Key distinctions from previous designs include the maximum potential for further fairing width reduction. This is due to a reduction in actuator loads and sizing with dualized actuators sharing load, which consequently allows structural supports to package tighter together in the fairing. This concept, while adding structures and systems parts relative to single linear hydraulic actuator designs, enables the thinnest and smallest fairings of any flap support previously designed. Additionally, this invention eliminates the critical flap flutter failure mode of actuator disconnect, which can result in major planform changes or systems being added to an aircraft.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A manufacture configured to move a flap for an aircraft wing, wherein the manufacture comprises:
   a linear actuator;
   a carrier fitting connected the linear actuator;
   a carrier beam connected to the carrier fitting and configured to connect directly to the flap;
   an aft link connected to the carrier beam and to the carrier fitting; and
   a frame rib that comprises a first web spaced from a second web and only four connection points that comprise:
      a first connection point configured to connect to an underside of the aircraft wing;
      a second connection point configured to connect to a rear spar fitting in the aircraft wing;
      a third connection point connected to the linear actuator; and
      a fourth connection point connected to the carrier fitting.

2. The manufacture of claim 1, wherein:
   the first web and the second web define a volume that comprises a width;
   the second connection point configured to connect directly to the rear spar fitting; and
   a planar surface connects the first web to the second web.

3. The manufacture of claim 1, wherein the carrier fitting is connected to a first end of the linear actuator and a second end of the linear actuator is connected to frame rib.

4. The manufacture of claim 1, wherein:
   the carrier fitting and the linear actuator are positioned within a width between the first web and the second web; and
   the linear actuator comprises one of a linear hydraulic actuator and a linear electronic actuator.

5. The manufacture of claim 1, wherein the linear actuator is a first linear actuator and further comprising a second linear actuator connected to the frame rib and connected to the carrier fitting.

6. The manufacture of claim 5, wherein both the first linear actuator and the second linear actuator are positioned between the first web and the second web.

7. The manufacture of claim 2, further comprising a second linear actuator positioned outside of the volume.

8. The manufacture of claim 2, wherein the third connection point is located within the width.

9. The manufacture of claim 1, wherein the linear actuator comprises two separated cylinders.

10. The manufacture of claim 1, wherein the linear actuator is contained within confines of the frame rib.

11. A flap deployment system for an aircraft wing, wherein the flap deployment system comprises:
    a rear spar fitting in the aircraft wing;
    a linear actuator;
    a carrier fitting connected the linear actuator;
    a carrier beam connected to the carrier fitting;
    an aft link connected to the carrier beam and to the carrier fitting;
    a frame rib that comprises:
       a first web and a second web, the first web spaced from the second web by a width; and
       only four connection points that comprise:
          a first connection point configured to connect to an underside of the aircraft wing;
          a second connection point connected to the rear spar fitting;
          a third connection point connected to the linear actuator;
          a fourth connection point connected to the carrier fitting; and
    a flap connected to the carrier beam.

12. The flap deployment system of claim 11, wherein the frame rib is directly connected to the rear spar fitting.

13. The flap deployment system of claim 12, wherein the the linear actuator is pivotally connected to the rear spar.

14. The flap deployment system of claim 11, wherein the carrier fitting is pivotally connected to the frame rib and pivotally connected to the linear actuator.

15. The flap deployment system of claim 11, wherein the linear actuator is a first linear actuator and further comprising a second linear actuator connected to the frame rib and connected to the carrier fitting.

16. The flap deployment system of claim 15, wherein both the first linear actuator and the second linear actuator are positioned between the first web and the second web.

17. The flap deployment system of claim 11, further comprising a second linear actuator positioned outside of the width between the first web and the second web.

18. A method for deploying a flap of an aircraft wing, the method comprising:

forming a frame rib comprising a first web separated from a second web defining a volume comprising a width;

connecting the frame rib to a first point underneath the aircraft wing and to a second point on a rear spar fitting of the aircraft wing;

pivotally connecting a linear actuator to the frame rib and to the flap;

connecting the flap to a carrier beam connected to an aft link connected to a carrier fitting connected to the frame rib and to the carrier beam; and operating the linear actuator.

19. The method of claim 18, wherein the carrier beam, the carrier fitting, and the aft link are positioned outside of the volume.

20. The method of claim 19, wherein operating the linear actuator comprises extending a piston connected to the flap.

\* \* \* \* \*

UNITED STATES PATENT AND TRADEMARK OFFICE
CERTIFICATE OF CORRECTION

Page 1 of 1

PATENT NO. : 12,252,235 B2
APPLICATION NO. : 18/172569
DATED : March 18, 2025
INVENTOR(S) : Samuel L. Block and Kevin R. Tsai It is certified that error appears in the above-identified patent and that said Letters Patent is hereby corrected as shown below:

In the Claims

Column 10, Line 6, Claim 3, correct "to frame rib." to read -- to the frame rib. --

Signed and Sealed this
Fifteenth Day of April, 2025

Coke Morgan Stewart
*Acting Director of the United States Patent and Trademark Office*